B. H. SKINNER.
MESSAGE REGISTER TEST SET.
APPLICATION FILED JUNE 1, 1916.

1,236,492.

Patented Aug. 14, 1917.
2 SHEETS—SHEET 1.

Witness
Inventor
Benjamin H. Skinner
By George Bayard Jones,
Atty.

B. H. SKINNER.
MESSAGE REGISTER TEST SET.
APPLICATION FILED JUNE 1, 1916.

1,236,492.

Patented Aug. 14, 1917.
2 SHEETS—SHEET 2.

Witness
Inventor
Benjamin H. Skinner

UNITED STATES PATENT OFFICE.

BENJAMIN H. SKINNER, OF BERWYN, ILLINOIS, ASSIGNOR TO WESTERN ELECTRIC COMPANY, OF NEW YORK, N. Y., A CORPORATION OF NEW YORK.

MESSAGE-REGISTER-TEST SET.

1,236,492.  Specification of Letters Patent.  Patented Aug. 14, 1917.

Application filed June 1, 1916. Serial No. 101,047.

*To all whom it may concern:*

Be it known that I, BENJAMIN H. SKINNER, a citizen of the United States, residing at Berwyn, in the county of Cook and State of Illinois, have invented new and useful Improvements in Message - Register - Test Sets, of which the following is a full, clear, concise, and exact description.

This invention relates to an improved electrical testing set which is particularly adapted for use in telephone central exchanges for testing message registers or line meters. In a co-pending application, Serial Number 100,222, filed May 27, 1916, electrical testing set, there is disclosed apparatus designed, among other uses, to test relays, said apparatus having certain features in common with the apparatus disclosed herein, and some of the claims of said co-pending application being drawn to cover said common features.

Message registers or line meters are used for counting the calls on a line and are connected with the telephone circuits, their operation being under the control of the exchange operators. In order to insure the most efficient operation of the telephone system under normal conditions, such registers or meters must operate when a current of predetermined value flows through the windings thereof, and the registers must not operate when current below such value is sent therethrough. Where the registers have each a high resistance winding and a low resistance or holding winding the registers must not release, that is, they must hold their armature for a certain current flow through the holding winding after a current of predetermined value has passed serially through both windings. In telephone exchanges, it is customary to frequently subject such registers to operating, non-operating, holding, and releasing current tests. In carrying out such tests, use is made of fixed and variable resistances, a plurality of switches, an indicating instrument, and other current modifying and controlling devices, all these devices being connected by conductors. Heretofore, special connections have had to be made for the operating, non-operating, and holding tests, and the apparatus and conductors for such tests were usually loose on a testing table, shelf or bench. With such temporary and more or less crude arrangement, contacts and connections can readily loosen and become broken, and the testing is laborious, tedious, time-consuming and more or less uncertain and unreliable.

The object of the invention is to provide means for greatly simplifying the testing of message registers, line meters, or the like, and to make such testing more certain and reliable by so arranging and mounting the resistances, switches, keys, instruments and other devices in an inclosure of small volume and permanently connecting these various devices, that the various temporary connections heretofore required may be dispensed with. A portable testing outfit or testing set is thus produced with which it is necessary only to connect a battery lead, a ground lead, and the register to be tested, all other connections being permanently within the inclosure. By means of switches and movable contacts the various testing circuits can be set up and the connected register subjected to the various tests.

One embodiment of the invention is illustrated in the accompanying drawings, in which, Figure 1 is a plan view of the test set with the cover removed;

Figure 1:
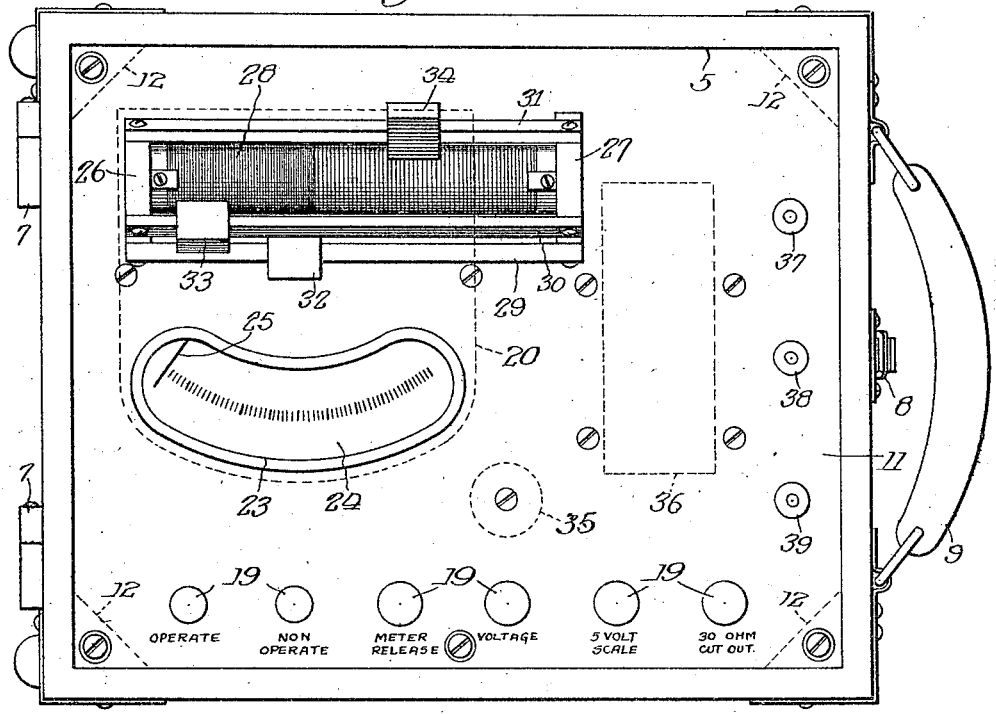
Figure 2:
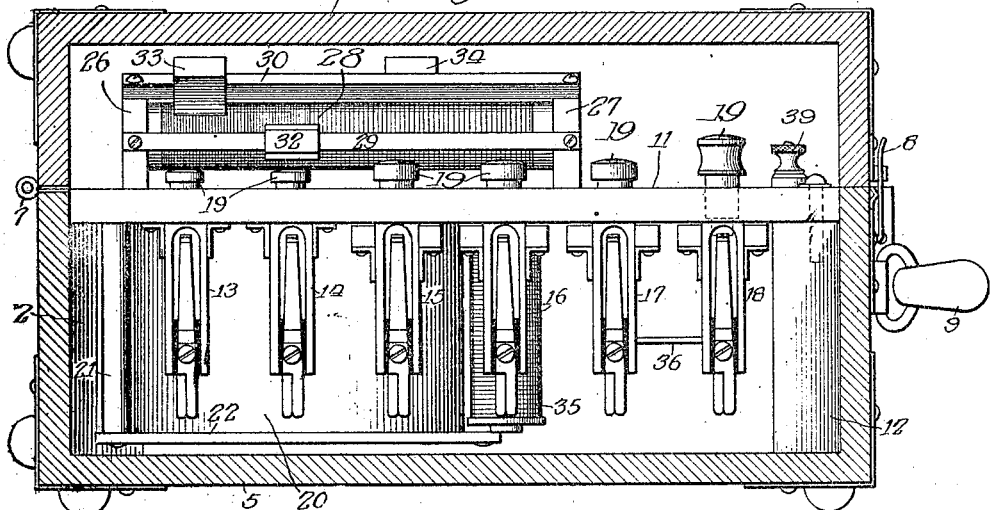
Fig. 2 is a side elevational view with the inclosure body and cover in vertical section.
Figure 3:
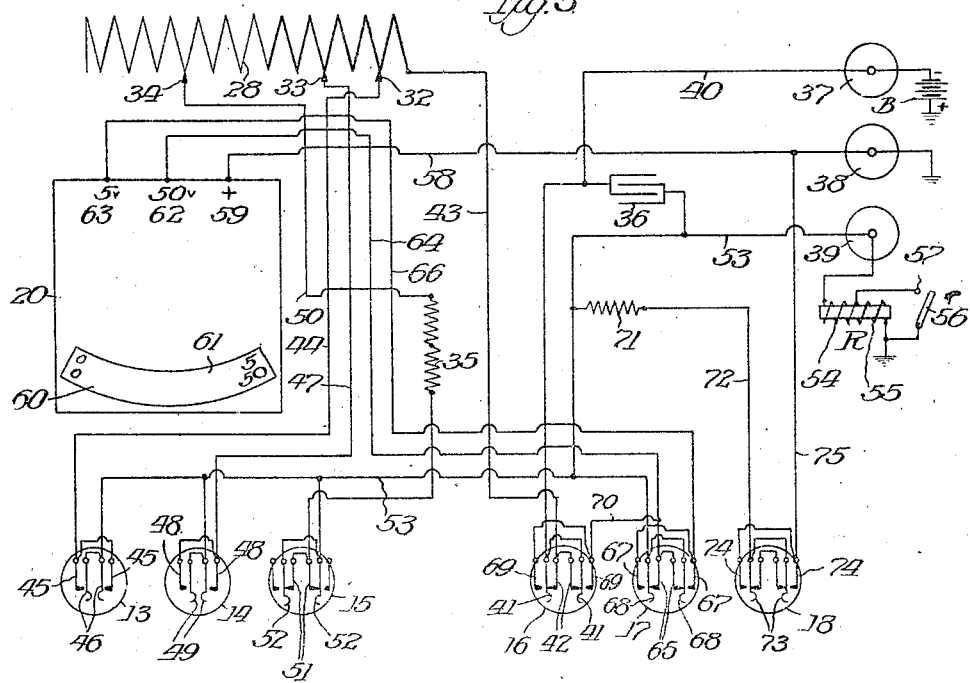
Fig. 3 represents diagrammatically the testing apparatus and circuit connections where the positive side of the battery is grounded.
Figure 4:
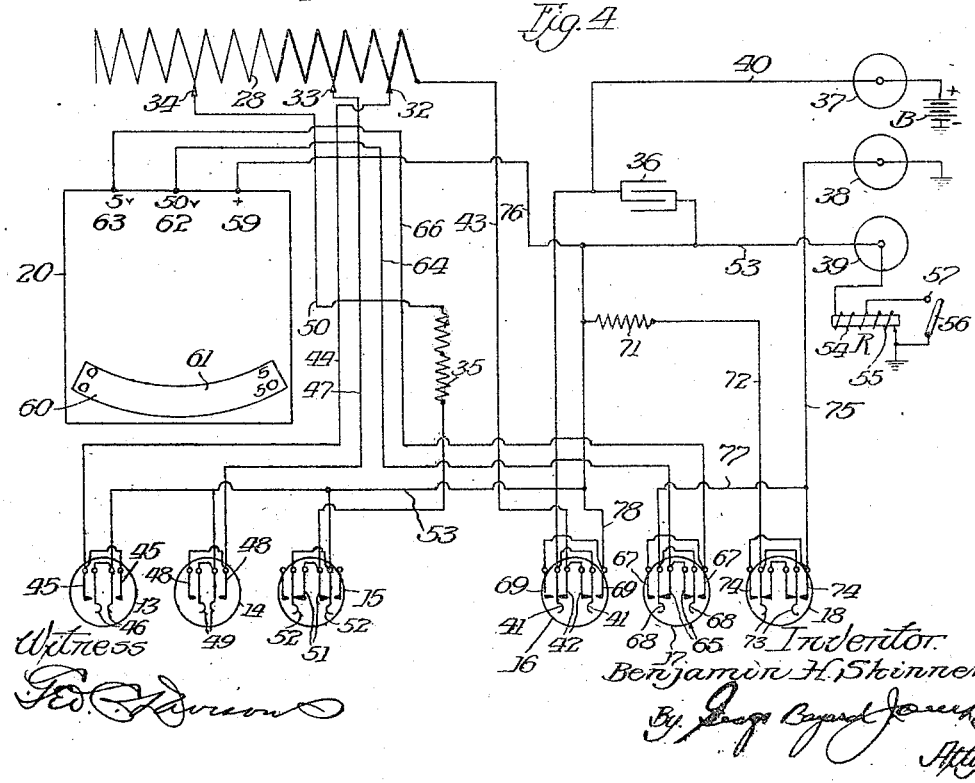
Fig. 4 represents diagrammatically the testing apparatus and circuit connections where the negative side of the battery is grounded.

The inclosing case comprises a rectangular box 5 having a cover 6 held thereto by separable hinges 7, the latch 8 and the grip 9 being provided at one end. A base 11 is secured on posts 12 in the body 5 and supports the various parts necessary for testing. Along the front edge of the base are the keys 13, 14, 15, 16, 17 and 18 of the well-known type comprising springs with which wedge buttons 19 coöperate, the buttons being slidable in openings through the base. In Figs. 3 and 4, the contacts associated with the various key springs are diagrammatically shown and will be referred to further in the description of circuits and operation.

Behind the keys and at the left side of the base, a volt meter 20 is suspended from the under side of the base by posts 21 and straps 22, the base having the sight opening 23 through which the volt meter scale 24 and needle 25 are visible.

Behind the volt meter sight opening, supporting disks 26 and 27 are mounted on the base and support the coil 28 of resistance wire. Bars 29, 30 and 31 are supported on said disks parallel with the coil and form slide-ways for contact sliders 32, 33 and 34. The sliders, with the resistance winding, form a variable resistance outfit. Supported from the under side of the base is another resistance coil 35. A condenser 36 is also mounted on the under side of the base. Along the right edge of the base are the three binding posts 37, 38 and 39.

In Fig. 3 the connections between the various testing devices are shown. The terminal post 37 is connected by conductor 40 with the springs 41 of the key 16, the inner contacts 42 of the key which normally engage the springs, being connected by conductor 43 with the end of the variable resistance winding 28. Contact slider 32 is connected by conductor 44 with the contacts 45 associated with the springs 46 of key 13. Contact slider 33 is connected by conductor 47 with the contacts 48 associated with the springs 49 of key 14. Contact slider 34 is connected by conductor 50 with the inner contacts 51 associated with the springs 52 of key 15, the conductor 50 including the resistance 35. The springs 46, 49 and 52 of the keys 13, 14 and 15 are all connected with conductor 53 which leads to the binding post 39. In practice the binding post 37 is connected with battery and the binding post 39 is connected with the register to be tested. As shown, the battery B has its negative pole connected with the post 37 and its positive pole connected with ground. The register R shown connected with post 39, has the high and low resistance windings 54 and 55 connected serially together, the outer end of the winding 54 connecting with the post 39 and the outer end of the winding 55 connecting with ground, the armature 56 of the register connecting with ground and the contact 57 connecting with the inner terminals of the resistance windings, the contact and armature being normally out of contact.

The terminal post 38 is in practice connected with ground, and is connected by conductor 58 with the terminal 59 of the volt meter. The volt meter has the high and low reading scales 60 and 61 with which the needle 25 coöperates when the terminals 62 or 63 are brought into circuit. The terminal 62 is connected by conductor 64 with the inner contacts 65 of the key 17 while the terminal 63 of the volt meter is connected by conductor 66 with the outer contacts 67 of the key. The springs 68 of the key connect with conductor 53 and thus with the terminal post 39 with which is connected the register to be tested. The inner contacts 65 of the key 17 and the outer contacts 69 of the key 16 are connected together by conductor 70.

In telephone exchange systems where the resistances of the various devices are known, the voltage corresponding to any desired current flow can be readily calculated. A volt meter can therefore be used with great accuracy in the improved testing set. To illustrate the operation and utility of the testing set, suppose it is desired to test the register R connected therewith for operation, non-operation, holding and release. Assume that the operating current for proper service conditions is represented by 26 volts on the large scale of the volt meter; that the non-operating current is represented by 23 volts; and the holding current is represented by .6 volt on the small scale of the volt meter. To make the test, setting is preferably first made for the holding or locking circuit. Key 17 is non-locking and its springs normally engage the inner contacts 65 which connect with the high reading scale on the volt meter. For the holding current the low scale should be used and key 17 is therefore held depressed while the slider contact 34 is shifted along the variable resistance 28 until the volt meter indicates .6 volt, the circuit being the following: from battery B through conductor 40, springs 41 and inner contacts 42 of key 16, conductor 43, the variable resistance 28, contact slider 34, conductor 50, fixed resistance 35, inner and spring contacts of key 15, conductor 53, terminal post 39, and serially through the windings 54 and 55 of the register R to ground and back to battery. The key 15 is normally closed and current will continue to flow through this circuit, but the current will not be sufficiently strong to pull up the armature of the register.

The key 17 is now released to connect the high reading scale and key 13 is depressed and slider contact 32 adjusted on the variable resistance 28 until the volt meter indicates 26 volts on the high reading scale, the circuit being from battery through conductor 40, through key 16 through the variable resistance, through contact 32, conductor 44 and key 13 to conductor 53 and through the register. When adjusting for the operating current, the armature of the register is preferably held from making contact in order that both windings will remain serially in circuit during adjustment.

After adjustment for the operation test, the key 13 is released and the key 14 depressed and slider contact 33 adjusted on the variable resistance until the volt meter indicates 23 volts on the high reading scale, the circuit being from the battery through conductor 40, key 16, the variable resistance, contact 33, conductor 47, key 14, and conductor 53, and the register to ground. To ascertain at any time whether the battery is at proper voltage, the key 16, which is non-locking, is depressed to connect the volt meter in bridge of the battery, the circuit being from the battery, conductor 40, through conductor 69, conductor 64, through the volt meter on the high reading scale, and conductor 58 to ground.

After the various adjustments, the test of the connected register is proceeded with. The key 13 is depressed first to send operating current serially through the register windings, the volt meter indicating on the high scale. If the register is properly adjusted, it will draw up its armature against contact 57 and the low resistance winding 55 will be short-circuited. The key 15 being normally closed, the holding or non-releasing current represented by .6 volt indication on the low reading scale is always flowing through the register, and when the key 13 is released to interrupt the operating current flow and to leave only the holding current, the register will remain locked, that is, its armature will remain attracted if the register is properly adjusted. To determine whether the holding current is of the correct value when the key 13 is released, the key 17 can be depressed to shift from the high reading to the low reading volt meter scale.

After the operating and releasing tests the nonoperating test is made by first depressing key 15 to interrupt the holding circuit, and then depressing key 14 while key 15 is being held depressed. If the volt meter indicates 23 volts and the register is properly adjusted it will not operate, that is, the current will not be of sufficient strength to draw up the register armature. The interval between the operation of the releasing key 15 and operation of the key 14 should be as small as possible so as to test the register for non-operation before the magnetic saturation decreases. A register can thus be connected to the test set and quickly tested for its various characteristics. As the registers in a telephone exchange system are usually all of the same dimensions and all operating under the same conditions, it is necessary only to make one resistance setting on the testing set and the registers can then be successively connected with the test post 39 and the various testing keys operated. If any register fails to operate properly under the predetermined current flows, proper adjustment is made until the operation is perfect.

In practice, when a register is connected in service with a line, its windings are usually connected in parallel with the cut-off relay for that line. Registers are, however, frequently tested before installation, that is, before being wired to the circuits. When making such test it is therefore necessary to duplicate service conditions by bridging a winding around the register whose resistance is equal to that of the cut-off relay. In Fig. 3 a resistance 71 is shown whose one terminal is connected with the test post 39 through conductor 53 and whose other terminal is connected through conductor 72 with the springs 73 of key 18 whose outer contacts 74 are connected by conductors 75 with the ground post 38. The key 18 is a locking key and normally the key is open to disconnect the resistance 71 from circuit. When it is desired to test a register which is not wired into service, the key 18 is depressed and is locked to connect resistance 71 in parallel with the register connected with the test set so that service conditions can be duplicated. To eliminate sparking at the various key contacts the condenser 36 is provided and bridged between the battery post 37 and the test post 39.

The wiring arrangement shown in Fig. 3 is provided when the test set is to be used in exchanges where the positive side of the battery is grounded. In Fig. 4 is shown the winding arrangement for the test set where such set is to be used in exchanges where the negative side of the battery is grounded. The connections, except for slight modification in the volt meter connections, are the same as in Fig. 3. The common terminal 59 of the volt meter instead of connecting with the ground post 38 is connected by conductor 76 with the conductor 53 which leads to the test post 39, and the springs 68 of key 17 instead of connecting with the test post through conductor 53 are connected by conductor 77 with conductor 75 which leads to the ground post 38. The outer contacts 69 of key 16 instead of connecting with the volt meter, as in Fig. 3, are connected by conductors 78 with conductor 53 leading to the test post 39. Settings for the various tests are made in exactly the same manner in the arrangement of Fig. 4 as in the arrangement of Fig. 3 and the various keys are operated in the same sequence.

With the foregoing structural and circuit arrangements, a very simple and compact test set is produced, with which the message registers in a telephone exchange can be quickly and efficiently tested to ascertain whether they are properly adjusted for service conditions. No connections are necessary except connection of battery and ground leads with the test set and the successive connections of the registers to the test set. All other connections are permanently made within the test set and all that is necessary is to depress the various keys and to observe the volt meter indications.

The invention is not to be limited to the construction, circuit arrangement and operation shown, or to the use of the testing set for testing registers. The set may be used for testing other electro-magnetic devices in addition to registers.

What is claimed is:

1. In a message register test set, the combination of a supporting base, a variable resistance and a volt meter mounted thereon, three terminal posts on said support adapted to be respectively connected with battery, ground and a message register to be tested, switches mounted on said base, a conductor connecting said resistance with said battery terminal post, a conductor connecting one side of said switches with the test terminal post, movable contacts for engagement with said variable resistance, a branch conductor connecting the other side of each of said switches with one of said movable contacts, and conductors connecting said volt meter to the test terminal post and the ground terminal post.

2. In a message register test set, the combination of a supporting base, a variable resistance and a volt meter mounted thereon, three terminal posts on said support adapted to be respectively connected with battery, ground and a message register to be tested, switches mounted on said base, a conductor connecting said resistance with said battery terminal post, a conductor connecting one side of said switches with the test terminal post, movable contacts for engagement with said variable resistance, a branch conductor connecting the other side of each of said switches with one of said movable contacts, and conductors connecting said volt meter to the test terminal post and the ground terminal post, two of said switches being normally open and a third being normally closed.

3. In a message register test set, the combination of a supporting base, a resistance coil and a volt meter mounted on said base, a battery terminal post, a ground terminal post and a test terminal post mounted on said base and adapted respectively for connection with battery, ground and a message register to be tested, an "operate" switch and a "non-operate" switch mounted on said base, a conductor connecting one terminal of said resistance coil with the battery terminal post, a conductor connecting one side of said switches with the test terminal post, movable contacts engaging said resistance coil, a conductor connecting the other side of each switch with one of said contacts, said switches being normally open, a circuit for the volt meter, and switch mechanism on said base for connecting said meter circuit with the test and ground terminal posts or with the battery and ground terminal posts.

4. In a message register test set, the combination of a supporting base, a resistance coil and a volt meter mounted on said base, a battery terminal post, a ground terminal post and a test terminal post mounted on said base and adapted respectively for connection with battery, ground and a message register to be tested, an "operate" switch and a "non-operate" switch mounted on said base, a conductor connecting one terminal of said resistance coil with the battery terminal post, a conductor connecting one side of said switches with the test terminal post, movable contacts engaging said resistance coil, a conductor connecting the other side of each switch with one of said contacts, said switches being normally open, a circuit for the volt meter, switch mechanism on said base for connecting said volt meter circuit with the test and ground terminal posts or with the battery and ground terminal posts, said volt meter having two indicating scales and switch mechanism on said base for connecting said volt meter for indication on either scale.

5. In a message register test set, the combination of a supporting base, a resistance winding mounted thereon, a battery terminal post and a test terminal post on said base adapted to be respectively connected with battery and with a register to be tested, a test circuit connected with said terminal posts, movable contacts associated with said resistance whereby setting may be made for the inclusion of any amount of said resistance in the test circuit, a plurality of switches mounted on said base to control the closure of the circuit through the resistances set up by the contacts, two of said switches being normally open and a third being normally closed, and an instrument adapted for connection with the test circuit to indicate the current flow therethrough when said circuit is closed to the various resistance set-ups.

6. In a message register test set, the combination of a supporting base, a resistance winding and a volt meter mounted thereon, a battery terminal post and a ground terminal post and a test terminal post mounted on said base to be connected respectively with battery, ground and a register to be tested, an "operate" switch key, a "non-operate" switch key and a "holding" switch key mounted on said base, a conductor connecting said battery terminal post with one terminal of said resistance, a conductor connecting one side of said switch keys with said test terminal post, movable contacts associated with said resistance, the other side of each of said switch keys being connected with one of said movable contacts, said "operate" and "non-operate" switch keys being normally open and the "holding" switch key being normally closed, a circuit for the volt meter, and a switch key on said base for controlling the connection of said volt meter circuit either with the test terminal post and ground terminal post or with the battery terminal post and the ground terminal post.

7. In a message register test set, the combination of a supporting base, a resistance winding and a volt meter mounted thereon, a battery terminal post, a ground terminal post and a test terminal post mounted on said base to be connected respectively with battery, ground and a register to be tested, an "operate" switch key, a "non-operate" switch key and a "holding" switch key mounted on said base, a conductor connecting said battery terminal post with one terminal of said resistance, a conductor connecting one side of said switch keys with said test terminal post, movable contacts associated with said resistance, the other side of each of said switch keys being connected with one of said movable contacts, said "operate" and "non-operate" switch keys being normally open and the "holding" switch key being normally closed, a circuit for the volt meter, a switch key on said base for controlling the connection of said volt meter circuit either with the test terminal post and ground terminal post or with the battery terminal post and the ground terminal post, said volt meter having two scales, and a switch on said base for controlling the volt meter circuit for indication of the volt meter on either scale.

8. In a message register test set, the combination of a supporting base, a resistance winding and a volt meter mounted thereon, a battery terminal post, a ground terminal post and a test terminal post mounted on said base to be connected respectively with battery, ground and a register to be tested, an "operate" switch key, a "non-operate" switch key and a "holding" switch key mounted on said base, a conductor connecting said battery terminal post with one terminal of said resistance, a conductor connecting one side of said switch keys with said test terminal post, movable contacts associated with said resistance, the other side of each of said switch keys being connected with one of said movable contacts, said "operate" and "non-operate" switch keys being normally open and the "holding" switch key being normally closed, a circuit for the volt meter, a switch key on said base for controlling the connection of said volt meter circuit either with the test terminal post and ground terminal post or with the battery terminal post and the ground terminal post, an additional resistance on said base, and a switch key on said base for connecting the terminals of said resistance to the test and ground terminal posts.

In witness whereof, I have hereunto subscribed my name this 29th day of May, 1916.

BENJAMIN H. SKINNER.